Oct. 20, 1925.                                                          1,558,184
                          J. H. KLUENDER
                         INTERLOCKED JOINT
                        Filed Oct. 31, 1924

Inventor
John H. Kluender

Patented Oct. 20, 1925.

1,558,184

UNITED STATES PATENT OFFICE.

JOHN H. KLUENDER, OF KENOSHA, WISCONSIN.

INTERLOCKED JOINT.

Application filed October 31, 1924. Serial No. 747,012.

*To all whom it may concern:*

Be it known that I, JOHN H. KLUENDER, a citizen of the United States, and resident of Kenosha, in the county of Kenosha and State of Wisconsin, have invented certain new and useful Improvements in Interlocked Joints; and I do hereby declare that the following is a full, clear, and exact description thereof.

This invention relates to interlocking joints.

Objects of this invention are to provide an interlocking joint which is applicable to any purpose where a stretching or toggle action is required followed by a complete and secure locking of the joint such for instance as is required with certain types of automobile tops, tents, and other similar places.

Further objects are to provide an interlocking joint which is free from bolts, which is composed of two main members and is devoid of auxiliary latches, pins or other undesirable elements, which will not rattle, which is positive and secure when locked, and which is easily manipulated.

Further objects are to provide an interlocking joint which is rigid against lateral motion in either direction, which will break in only a forward direction, and which rigidly locks itself against any motion tending to move the joint rearwardly.

An embodiment of the invention is shown in the accompanying drawings, in which:—

For the purpose of illustration, the joint has been shown as applied to an automobile top, such for instance as the semi-permanent top which is normally rigidly bolted at the front of the automobile in any suitable manner, and which is customarily held by a bolted brace at its rear. The joint, however, is applicable to a large number of other uses.

Figure 1:
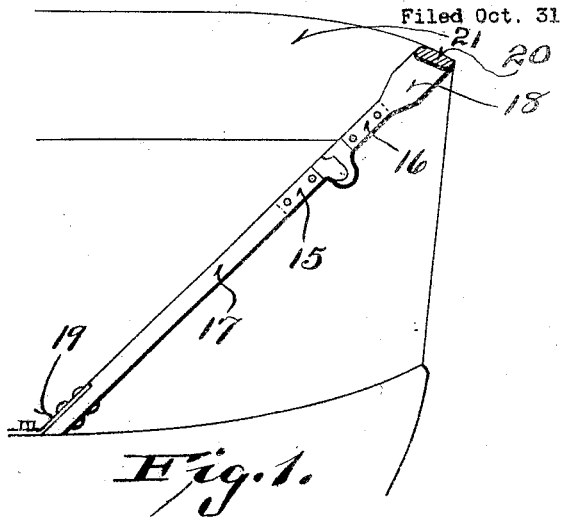
Figure 1 is a fragmentary view of the rear portion of an automobile showing the joint in place on the rear brace of the top.
Figure 2:
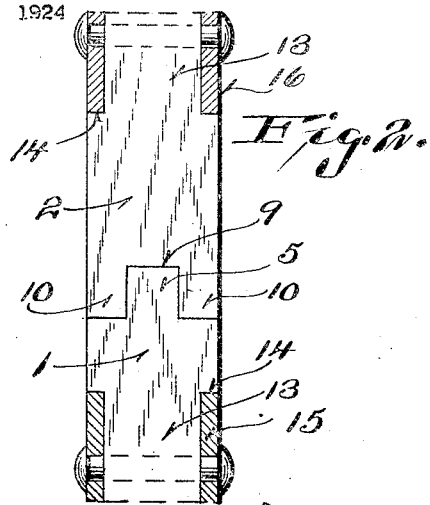
Figure 2 is a detail of the joint looking at it from its front side and showing the side flanges to which it is attached, in section.
Figure 3:
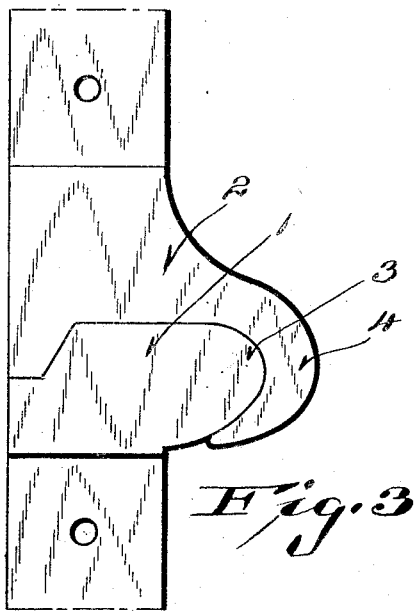
Figure 3 is a side view of the joint showing it in locked position.

Referring particularly to the drawings, it will be seen that the joint comprises a male member 1 and a female member 2, the male member is provided with an enlarged head which has a rounded rear portion 3 and the female member is provided with a similarly curved overhanging lip 4 which, when the joint is locked, as shown in Figure 3, accurately conforms to the rear protuberance 3 of the male member. The front portion of the male member is provided with a centrally located web or lug 5 (see Figures 2 and 3,) and is provided with cutouts on opposite sides of this central lug, as indicated at 6 in Figure 4. These cutouts have rear slanting faces 7 and flat bottom faces 8. The female member is equipped with a central cutout at its forward side, as indicated at 9 in Figure 2, and is provided with spaced lugs 10 on opposite sides of this cutout. These spaced lugs 10 are provided with slanting rear faces 11 and with flat bottom faces 12 (see Figure 4) and are adapted to accurately fit the cutouts 6, whereas the lug 5 is adapted to fit within the cutout 9 (see Figure 2). The members 1 and 2 are each provided with outwardly extending shanks 13 which are preferably integral with the body portions of the respective members, suitable shoulders 14 being provided at the line of union of the shanks with the body portions of the members, as shown in Figure 2. These shanks are adapted to be received between side plates 15 and 16 of the braces 17 and 18 (see Figures 1 and 2.)

In the form chosen for illustration, the joint has been shown as applied to the rear slanting brace of an automobile top. This brace, as described, is composed of the members 17 and 18, the member 17 being rigidly bolted or riveted to the upstanding portion of a clip 19 secured to the body portion of the automobile, and the member 18 being secured to the transverse bar 20 of the top 21.

Figure 4:
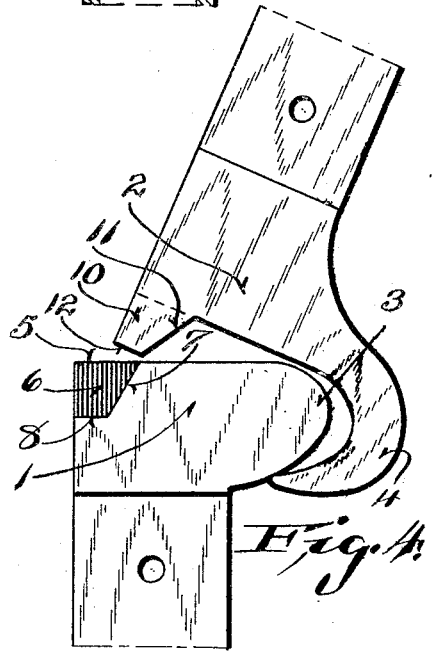
Figure 4 is a corresponding view showing it partially detached or unlocked.

In assembling the joint and braces in the form shown, the clip 19 is preferably secured to the body portion of the car but is free from the portion 17 of the brace. The bottom of the arm or standard 17 of the brace is positioned rearwardly of the clip 19 and the joint is partially connected, as shown in Figure 4. Thereafter, the joint is rocked rearwardly until it snaps into the closed position, as shown in Figure 1. The clip 19 is then rigidly secured to the lower end of the brace or standard 17.

It is to be noted that the stresses in the top tend to move the rear portion thereof forwardly and downwardly. This is very effectively resisted by the peculiar joints illustrated and such forces merely tend to maintain the joint in a tightly locked condition.

It is to be noted that this joint is free from bolts, pins or other parts that may rattle and come loose and that also the joint itself will not rattle as it is rigidly held tightly in locked position.

It is to be distinctly understood, as pointed out above, that the joint is applicable for use in a large number of different places and provides a very secure break down joint which is strong and rigid, and which is locked against rearward motion and against lateral motion in either direction by its inherent characteristics.

Although the invention has been described in considerable detail, it is to be understood that the invention may be variously embodied and is, therefore, to be limited only as claimed.

I claim:

1. An interlocking joint comprising a male member having a head provided with a rounded protuberance on one side and having a central lug on the other side, and a female member having a curved lip adapted to enclose said protuberance and having a pair of spaced lugs on the opposite side from said lip, said spaced lugs being positioned on opposite sides of said central lug when said joint has been rocked into locking position.

2. An interlocking joint comprising a male member having a head provided with a rounded protuberance at one side, a female member having a head provided with a grooved lip projecting from one side and adapted to enclose said rounded protuberance, one member having a pair of spaced lugs on the opposite side from its interlocking engaging element, and the other member having a correspondingly positioned central lug for intermeshed engagement with the spaced lugs of the other member when said joint has been locked in its rocked position, whereby the parts are held against lateral motion.

In testimony that I claim the foregoing I have hereunto set my hand at Kenosha, in the county of Kenosha and State of Wisconsin.

JOHN H. KLUENDER.